United States Patent
Schall et al.

(10) Patent No.: US 9,366,181 B2
(45) Date of Patent: Jun. 14, 2016

(54) TURBOCHARGER AND COMPRESSOR WHEEL THEREFOR

(75) Inventors: Gerald Schall, Bobenheim-Roxheim (DE); Melanie Gabel, Bad Duerkheim (DE)

(73) Assignee: BorgWarner Inc., Auburn Hills, MI (US)

( * ) Notice: Subject to any disclaimer, the term of this patent is extended or adjusted under 35 U.S.C. 154(b) by 1183 days.

(21) Appl. No.: 13/383,219

(22) PCT Filed: Jul. 7, 2010

(86) PCT No.: PCT/US2010/041142
§ 371 (c)(1),
(2), (4) Date: Jan. 10, 2012

(87) PCT Pub. No.: WO2011/011197
PCT Pub. Date: Jan. 27, 2011

(65) Prior Publication Data
US 2012/0144824 A1  Jun. 14, 2012

(30) Foreign Application Priority Data
Jul. 20, 2009 (DE) .......... 10 2009 033 899

(51) Int. Cl.
*C22C 21/14* (2006.01)
*F02C 6/12* (2006.01)
*F01D 5/28* (2006.01)
*F04D 29/02* (2006.01)
*F04D 29/28* (2006.01)
*F02B 39/00* (2006.01)

(52) U.S. Cl.
CPC . *F02C 6/12* (2013.01); *C22C 21/14* (2013.01); *F01D 5/28* (2013.01); *F04D 29/023* (2013.01); *F04D 29/284* (2013.01); *F02B 39/00* (2013.01); *F05D 2300/173* (2013.01)

(58) Field of Classification Search
IPC ........ F02B 33/44; F04D 29/18,29/023, 29/284; C22C 21/00, 21/14; F02C 6/12; F01D 5/28
See application file for complete search history.

(56) References Cited

U.S. PATENT DOCUMENTS

| 5,277,717 A | 1/1994 | LaSalle et al. |
| 5,527,101 A | 6/1996 | Kato et al. |
| 2009/0160091 A1 | 6/2009 | Zhu et al. |

FOREIGN PATENT DOCUMENTS

| EP | 0018942 A1 | 11/1980 |
| EP | 2133572 A1 | 12/2009 |
| JP | 2009501870 A | 1/2009 |
| WO | WO 2009010264 A2 * | 1/2009 |

OTHER PUBLICATIONS

'Aluminum and Aluminum Alloys', ASM International, 1993, p. 101.*

* cited by examiner

*Primary Examiner* — Roy King
*Assistant Examiner* — Janelle Morillo
(74) *Attorney, Agent, or Firm* — A. Michael Tucker; Stephan A. Pendorf; Patent Central LLC

(57) ABSTRACT

The invention relates to a compressor wheel for a turbocharger, in particular in combination with a diesel engine, and to an exhaust gas turbocharger comprising such a compressor wheel.

3 Claims, 1 Drawing Sheet

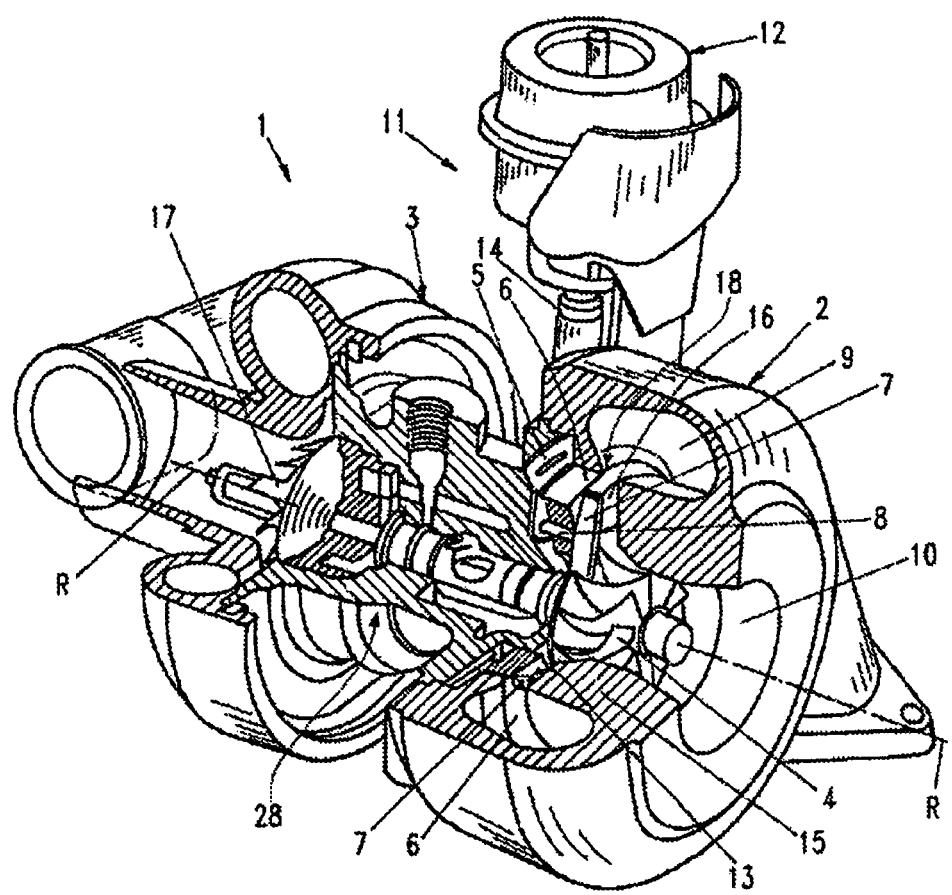

TURBOCHARGER AND COMPRESSOR WHEEL THEREFOR

BACKGROUND OF THE INVENTION

1. Field of the Invention

The invention relates to a compressor wheel for a turbocharger, in particular in combination with a diesel engine, to an exhaust gas turbocharger comprising a compressor wheel, and to a process for producing the compressor wheel.

2. Description of the Related Art

Exhaust gas turbochargers are systems intended to increase the power of piston engines. In an exhaust gas turbocharger, the energy of the exhaust gases is used to increase the power. The increase in power and reduction in emissions are the result of an increase in the throughput of mixture per working stroke.

A turbocharger substantially comprises an exhaust gas turbine with a shaft and a compressor, wherein the compressor wheel arranged in the intake tract of the engine is connected to the shaft and the blade wheels located in the casing of the exhaust gas turbine and the compressor rotate.

Exhaust gas turbochargers that allow multi-stage, i.e. at least two-stage, supercharging, such that even more power can be generated from the exhaust gas, are known. Multi-stage exhaust gas turbochargers of this type have a special design which comprises, inter alia, a regulating member for highly dynamic, cyclic stresses.

Extremely high demands are made on the material of the compressor wheel in the exhaust gas turbocharger. The material from which the compressor wheel is formed has to be heat-resistant and also has to be able to withstand high temperatures, i.e. still has to provide sufficient strength and additionally a good vibration resistance even at high temperatures of at least up to about 220° C. or even 280° C. Furthermore, the material has to be resistant to intercrystalline corrosion and stress crack formation in the acid medium, and it should also have a high material resistance in the case of a low number of stress cycles. In addition, the ductility of the material should be sufficiently high such that, in the event of overload, the parts can experience plastic deformation and do not break, which might result in the sudden release of energy with resulting damage.

An exhaust gas turbocharger with a two-flow exhaust gas inlet duct is known from DE 10 2007 018 617 A1.

Therefore, it was an object of the present invention to provide a compressor wheel for a turbocharger, and a turbocharger, which has an improved heat resistance and thermal stability and is distinguished by a good resistance to corrosion and stress crack formation in acid media. In addition, it was an object to provide a compressor wheel which has optimum ductility and an improved vibration resistance performance. It should thus be possible to produce a wear-resistant, highly vibration-resistant and permanently stable compressor wheel which tends toward neither stress crack formation nor intercrystalline corrosion, even at low pH values. Furthermore, it was an object to provide a process for producing the compressor wheel according to the invention, a material distinguished by the advantageous properties mentioned above being produced by means of said process.

BRIEF SUMMARY OF THE INVENTION

Owing to the design, according to the invention, of the compressor wheel for a turbocharger, consisting of an aluminum-based alloy having dendritic precipitation phases, the material which ultimately provides the compressor wheel in the exhaust gas turbocharger is distinguished by a particularly good heat resistance, i.e. also high-temperature strength and thus temperature resistance and stability. The stability and temperature resistance of the material according to the invention are obtained, in particular, by the dendritic precipitation phases forming high levels of dendrites in the material as a result of the interaction of the intermetallic phases. The high levels of dendrites of the intermetallic phases in the microstructure of the material are critical for the supporting action of the microstructure and therefore also for the resistance to lattice slip, for example, as a result of which the material becomes consolidated, is resistant to both static and cyclic mechanical loading and also has a high creep strength. Owing to the specific material combination for the compressor wheel according to the invention, consisting of an aluminum-based alloy having a dendritic phase microstructure, the adhesive and cohesive forces in the material matrix are also increased, and this contributes significantly to the stabilization of the material. It has surprisingly been found that the dendritic phase microstructure that forms within the material, i.e. the dendritic precipitation phases distinguished by high levels of dendrites of the intermetallic phases, provides the compressor wheel according to the invention with a high resistance to intercrystalline corrosion and stress crack formation.

Furthermore, it has been found that the compressor wheel according to the invention, which consists of an aluminum-based alloy having a dendritic phase microstructure, is resistant to corrosion and stress crack formation even in acid media. Within the context of the invention, an acid medium is to be understood as meaning a medium having a pH value of about 3.5 to 6 and, in particular, of about 4 to 5.5. "Acid" conditions also prevail in the exhaust gas turbocharger owing to condensation water and chlorides from the area surrounding the engine space. The material according to the invention is resistant to this and therefore also resistant to intercrystalline corrosion. This considerably reduces the tendency toward stress crack formation under tensile stress.

These outstanding material properties mean that the compressor wheel according to the invention is suitable for an exhaust gas turbocharger, in particular also for two-stage turbochargers and most particularly for those which are used in utility vehicles and here, in turn, for high-cycle bus applications which have high kilometer readings of at least 1.6 million kilometers in the field.

The dependent claims relate to advantageous developments of the invention.

BRIEF DESRIPTION OF THE SEVERAL VIEWS OF THE DRAWINGS

FIG. 1 shows a perspective view, partially in section, of an exhaust gas turbocharger according to the invention.

DETAILED DESRIPTION OF THE INVENTION

In one advantageous embodiment, the aluminum-based alloy described in the introduction comprises the element lanthanum. It has surprisingly been found that the element lanthanum in the aluminum-based alloy has a positive effect on the stability of the material. Without being bound to theory, it is assumed here that the element lanthanum in the aluminum-based alloy forms thermally stable $Al_3La$ phases, so-called age-hardening phases, which stabilize the microstructure in the alloy by forming microdendritic formations. A particularly good creep strength is thus obtained in the material, the heat resistance and the vibration resistance simultaneously being increased.

It has also been found that the addition of lanthanum to the aluminum-based alloy according to the invention has a considerable strength-increasing effect both at room temperature, i.e. at about 20° C., and at component temperatures of about 220° C. and even up to 300° C. It is also assumed here that this is attributable to the thermally stable $Al_3La$ phases that form and strengthen the dendritic phase microstructure. Therefore, lanthanum increases the heat resistance and also the resistance to material fatigue in the case of a low number of stress cycles and thus the stability of the material for the compressor wheel according to the invention.

According to one embodiment of the invention, the aluminum based alloy preferably comprises the element lanthanum in a quantitative proportion of 0.08 to 1.0% by weight and preferably of 0.1 to 0.5% by weight, based on the total weight of the alloy. The element lanthanum promotes the formation, distribution and structure of the precipitation phases in the aluminum-based alloy. As already mentioned, the element lanthanum forms $Al_3La$ phases which, owing to the dendrites thereof in the alloy microstructure, bring about considerable stabilization of the structure of the alloy and thus increase the resistance of the alloy to material fatigue in the case of a low number of stress cycles. It has been found that this is the case, in particular, when the quantitative proportion of lanthanum is 0.08 to 1.0% by weight and preferably 0.1 to 0.5% by weight, based on the total weight of the alloy. If lanthanum is present in a quantitative proportion of more than 0.5% by weight and, in particular, of more than 1.0% by weight, based on the total weight of the alloy, the dendrites in the microstructure of the aluminum-based alloy are so dense that this, in turn, destabilizes the material. If, by contrast, lanthanum is used in a quantitative proportion of less than 0.1% by weight and, in particular, of less than 0.08% by weight, respectively, based on the total weight of the alloy, precipitation or age-hardening phases that stabilize the structure are unable to form sufficiently, and therefore the alloy is distinguished by a considerably reduced stability and, in particular, a reduced heat resistance and creep strength. The creep rupture strength of a compressor wheel of this type is thus considerably lower compared to a compressor wheel according to the invention.

In a further preferred embodiment, the aluminum-based alloy according to the invention comprises the elements cerium and/or zirconium.

When the molten alloy material is solidified, the addition of the element cerium leads to the formation of AlCe precipitation phases which are included outstandingly in the dendritic phase microstructure of the aluminum-based alloy, even strengthen the latter and thus consolidate the material. Here, the AlCe precipitation phases have different compositions and improve the temperature resistance of the material considerably, such that high thermal stabilities of the compressor wheel according to the invention of 220° C. and even 280° C. are obtained. In addition, the corrosion resistance and resistance to stress crack formation and also the ductility of the material are increased.

The element zirconium also forms phases in the alloy, to be precise $Al_3Zr$ phases, as a result of which a crosslinking structure, a so-called chaining characteristic, is obtained in the microstructure. It has been found that $Al_3Zr$ precipitation phases are formed within the alloy material owing to the combination of aluminum and zirconium. The mechanical properties of the material are thereby significantly improved. A material formed in this way or a component formed from just such a material is distinguished by a very good temperature resistance and heat resistance up to 220° C. and even 280° C., is stable to corrosion and is insensitive to stress crack formation.

The addition of the element zirconium to the aluminum-based alloy can provide a compressor wheel which, owing to the formation of high levels of fine dendrites of the intermetallic phases formed, is distinguished by a very good material resistance in the case of a low number of stress cycles, has a high heat resistance up to 220° C. and even 280° C. and also displays a ductility that is sufficiently high for such a material. Without being bound to theory, it is assumed that for this purpose the $Al_3Zr$ phases that form form structures which encroach one upon the other in the phase microstructure and bring about an improved bond within the material and thus contribute significantly to the stability of the material.

The heat resistance, ductility and resistance of the material to stress crack formation and corrosion are improved, in particular, when the aluminum-based alloy comprises the element cerium in a quantitative proportion of 0.08 to 1.0% by weight and preferably of 0.1 to 0.5% by weight and/or the element zirconium in a quantitative proportion of 0.08 to 0.8% by weight and preferably of 0.1 to 0.3% by weight, based on the total weight of the alloy. If the elements cerium and/or zirconium are used in a proportion by weight of more than 0.5% by weight and, in particular, of more than 1.0% by weight for cerium and/or of more than 0.3% by weight and, in particular, of more than 0.8% by weight for zirconium, based on the total weight of the alloy, the number of precipitation phases of these two elements increases considerably, and therefore the microstructure within the aluminum-based alloy is impaired and the overall result is thus destabilization of the material instead. This worsens the more the respective proportions by weight of cerium and/or zirconium exceed the optimum quantitative proportions of the respective element. On the other hand, the material-stabilizing precipitation phases formed by the elements cerium and/or zirconium are unable to form sufficiently if the proportion by weight of cerium is less than 0.1% by weight and, in particular, less than 0.08% by weight, and/or if the proportion by weight of zirconium is less than 0.1% by weight and, in particular, less than 0.08% by weight, based on the total weight of the alloy. The alloy material according to the invention is stabilized in an optimum manner if the element cerium is present in the alloy in a quantitative proportion of 0.08 to 1.0% by weight and preferably of 0.1 to 0.5% by weight and/or the element zirconium is present in the alloy in a quantitative proportion of 0.08 to 0.8% by weight and preferably of 0.1 to 0.3% by weight, based on the total weight of the alloy.

The physical and mechanical properties of the material and thus of the compressor wheel can be optimized even further. In a preferred embodiment, the compressor wheel according to the invention is distinguished in that the aluminum-based alloy comprises further elements such as iron and/or manganese and/or magnesium and/or nickel and/or silicon and/or boron and/or copper and/or titanium. The property profile of each element is known in principle to a person skilled in the art. However, the material properties of the alloy which forms the compressor wheel according to the invention can also be improved considerably by suitable selection of the elements in the optimum concentration range thereof.

By way of example, the admixture of the element iron to an alloy may contribute to an increase in the heat resistance of the material owing to the formation of dispersoid phases, on account of their chaining properties. For this purpose; it is particularly advantageous if the iron content is in a range of up to 5% by weight and preferably less than 1% by weight, based on the total weight of the alloy. However, iron is not a compulsory constituent of the aluminum alloy in the context of the invention, and therefore the use concentration thereof is from 0 to 5% by weight.

The addition of titanium to the alloy according to the invention generally improves the grain distribution of the intermetallic composition. Here, titanium simultaneously serves for grain refinement of the casting throughout the composite alloy structure. Even very small concentrations of titanium of about 0.01 to 2.3% by weight, preferably of 0.05 to 1.3% by weight and particularly preferably of up to 0.25% by weight are sufficient to obtain good grain refinement of the material. Higher concentrations of more than 2.3% by weight do not improve the grain refinement further, but rather unnecessarily increase the costs for the alloy material. By contrast, it is scarcely possible to improve the grain refinement at concentrations of less than 0.05% by weight.

The element nickel is an element which likewise has a significant influence on the heat resistance and vibration performance of the compressor wheel according to the invention. It is precisely the combination of aluminum and nickel which in this case decisively increases the adhesive and cohesive forces of the material, particularly also in the acid medium, i.e. in a pH range of 3.5 to 6 and preferably of 4 to 5.5. This appears to be attributable to the formation of $Al_3Ni$ phases which significantly improve the phase microstructure of the alloy in the intermetallic microstructure. Nickel is preferably used in a content of 0.45 to 2.6% by weight, based on the total weight of the alloy, and particularly preferably in a content of up to 1.5% by weight, based on the total weight of the alloy. The properties which improve the stability in the acid pH range and in the high-temperature range of 220° C. and even 280° C. come into particularly sharp focus here.

It has now been found that zirconium optimizes the formation and distribution of the precipitation phases in the alloy. The mechanical properties both at room temperature and in a temperature range of up to 220° C. and even 280° C. are thereby influenced positively. The material for the compressor wheel according to the invention is thus distinguished by a heat resistance of up to 280° C. Furthermore, the creep strength and the vibration resistance of the alloy are improved further many times over. Niobium can optionally also be used in the aluminum-based alloy according to the invention. Niobium is not absolutely necessary for stabilizing the alloy according to the invention, but rather can be replaced, if appropriate, by appropriately Selecting the other optional elements.

The addition of the elements magnesium and manganese influences the strength of the alloy material and the solid solution formation in the microstructure of the alloy. The magnesium content is preferably chosen to be in a range of 0.15 to 2.9% by weight and, in particular, of 0.2 to 1.9% by weight, based on the total weight of the alloy. By contrast, the manganese content is preferably chosen to be in a range of 0.1 to 3.4% by weight and particularly preferably in a range of 0.16 to 2.8% by weight, based on the total weight of the alloy. Even more preferably, the concentrations of magnesium and manganese are selected so as not to exceed the concentration of 0.9% by weight for magnesium and 0.7% by weight for manganese. The influence on the strength of the alloy can already be seen to be extremely positive in such a low concentration range, and a further advantageous effect also stands out: the capability to form an alloy to be hot age-hardened with preceding solution annealing is increased considerably.

The addition of boron to the alloy material is also advantageous. Boron improves the castability in the permanent mold casting and, at the same time, reduces the possibility of defects occurring in larger batches of the material. In order to promote these properties to a particular extent, boron is preferably used in a quantitative proportion of 0.01 to 1.35% by weight and particularly preferably in a quantitative proportion of at most 0.05% by weight, based on the total weight of the alloy. Even lower concentrations neither reduce the formation of defects nor improve the castability. By contrast, concentrations higher than 1.35% by weight, based on the total weight of the alloy, do not promote the positive casting properties further.

The use of silicon in the alloy material is also advantageous. Silicon does not increase the strength of the material as much as the other elements, but the addition of silicon does improve the castability of the alloy material greatly. Together with aluminum, iron and also with magnesium, for example, silicon forms specific intermetallic phases such as $Mg_2Si$ or AlFeSi, these solid solutions and heterogeneous microstructure constituents having a positive influence on the physical, chemical and technological properties of the alloy. These outstanding properties in the alloy material are obtained with silicon particularly if the quantitative proportion of silicon is in a range of 0.12 to 3.15% by weight and preferably in a range of 0.3 to 2.05% by weight and particularly preferably at most 1.1% by weight, in each case based on the total weight of the alloy. Concentrations considerably higher than 3.15% do not improve the casting properties of the alloy further, while these properties are also only improved at silicon concentrations of at least 0.12% by weight.

A further advantageous element is copper. Copper has a significant influence on the increase in the strength of the alloy. This is the case, in particular, when copper is used in a quantitative proportion of more than 2.5% by weight. However, the elongation at break decreases slightly as the copper content increases. Therefore, copper is preferably used in a quantitative proportion of 1.1 to 5.0% by weight and particularly preferably in a quantitative proportion of 2.7 to 5.0% by weight, based on the total weight of the alloy. It is precisely in the preferred concentration range that copper improves the ability of the alloy material to undergo hot age-hardening. Heat treatment can thus achieve a particularly homogeneous microstructure within the aluminum-based alloy, and this promotes the strength and toughness of the material and thus the resistance thereof to mechanical loading, in particular also in a high temperature range. These positive properties appear to be attributable to the formation of intermetallic AlCu phases which produce a particularly dense and fine-grained microstructure, the grain refinement of which can be increased further by the addition of titanium, as already explained. The composition of the AlCu phases may vary and is dependent on further elements that may be present. $Al_2Cu$ and $Al_2CuMg$ phases thus form, inter alia, and these significantly improve the heat resistance of the alloy and thus of the compressor wheel according to the invention and the vibration resistance thereof.

In a further advantageous embodiment, the compressor wheel according to the invention is distinguished by an aluminum-based alloy further comprising the following elements or components in the quantitative proportions which follow, the quantitative proportions in each case being based on the total weight of the alloy: Fe: 0 to 5.0% by weight, Mn: 0.1 to 3.4% by weight, Cu: 1.1 to 5.0% by weight, Si: 0.12 to 3.15% by weight, Mg: 0.15 to 2.9% by weight, Ti: 0.01 to 2.3% by weight, Zr: 0.08 to 0.8% by weight, La: 0.08 to 1.0% by weight, in each case based on the total weight of the alloy and Al as balance. It is precisely the combination of these elements in the quantitative proportions indicated that leads to a material which, when processed to form a compressor wheel for an exhaust gas turbocharger, provides the latter with a particularly high stability with respect to corrosion and thermal loading and is further distinguished by a very good heat resistance and resistance to material fatigue in the case of a low number of stress cycles. The compressor wheel according to the invention has an improved creep strength and an outstanding vibration resistance performance. The properties mentioned above come into particularly sharp focus when the compressor wheel according to the invention comprises the following elements in the quantitative proportions indicated: Fe: 0 to 5.0% by weight, Mn: 0.16 to 2.8% by weight, Cu: 2.7 to 5.0% by weight, Si: 0.3 to 2.05% by weight, Mg: 0.2 to 1.9% by weight, Ti: 0.05 to 1.3% by weight, Zr: 0.1 to 0.3% by weight, La: 0.1 to 0.5% by weight, Ni: 0.45 to 2.6% by weight, Ce: 0.1 to 0.5% by weight, B: 0.01 to 1.35% by weight, in each case based on the total weight of the alloy and Al as balance.

A compressor wheel consisting of an aluminum-based alloy comprising the elements mentioned above is distinguished by particularly good properties.

A material that has been produced in accordance with the specific compositions last mentioned thus has the following properties:

The following tests were carried out in order to determine the stability of the material:
  open-air weathering tests
  hot tensile tests up to 300° C. where $R_m$>125 MPa
  creep strength up to 300° C.
  VDA alternating climate test in an acidic environment: 150 hours at pH 4 to 5.5 without intercrystalline corrosion-stress corrosion cracking
  LCF test: 2,000,000 cycles at 220° C., amplitude: >80 MPa: the vibration resistance tests were carried out in a force-controlled manner exclusively under single-stage axial pulsed loading (R=0). The ambient medium was air. The material was tested in a temperature range of room temperature (i.e. about 20° C.) to about 300° C. (material temperature).

The aluminum-based alloy according to the invention last mentioned above showed the best results in the above tests with respect to the chemical, physical and mechanical properties.

According to the invention, the aluminum-based alloy, which forms the basis for the compressor wheel according to the invention for a turbocharger, can be produced by means of suitable processes and, in particular, by means of a casting process still to be explained. The respective materials are weldable using conventional TIG-plasma processes and also EB processes. The heat treatment takes place by means of solution annealing at about 470° C. for 4 hours and subsequent air cooling. The precipitation hardening takes place at about 175° C. for 2 hours with air cooling in a box furnace.

The aluminum-based alloy is processed in accordance with conventional processes by melting of the base alloy, RS spraying, precompaction (densal HIP treatment), extrusion, forming and further machining (e.g. milling).

As an article that can be handled independently, claim 9 defines an exhaust gas turbocharger comprising, as already described, a compressor wheel consisting of an aluminum-based alloy having a dendritic phase microstructure.

The compressor wheel according to the invention is produced by a special process comprising the following steps:
  an aluminum-based alloy is melted,
  the aluminum-based alloy is transferred by means of a gas via a filter into a mold via a permanent mold casting system,
  the aluminum-based alloy is left to solidify, and
  the aluminum-based alloy is removed from the mold.

Only this provides an alloy material which, after further machining, provides a compressor wheel which is distinguished by an extremely good resistance to corrosion and stress crack formation, has a heat resistance up to 220° C. and even 280° C. and exhibits a markedly reduced material fatigue frequency in the case of a low number of stress cycles and a very good vibration resistance performance. By varying the gas pressure, by suitable selection of the filter material and selection of the pore size of the filter, it is possible to further influence the homogeneity of the microstructure matrix in a positive manner, and this can increase the creep strength and heat resistance of the material considerably.

FIG. 1 shows a perspective view, partially in section, of an exhaust gas turbocharger according to the invention. FIG. 1 shows the turbocharger 1 according to the invention, having a turbine casing 2 and a compressor casing 3 connected thereto via a bearing casing 28. The casings 2, 3 and 28 are arranged along an axis of rotation R. The turbine casing is shown partially in section in order to illustrate the arrangement of a blade bearing ring 6 and a radially outer guide grate 18, which is formed by the latter and has a plurality of guide blades 7 which are distributed over the circumference and have pivot axles 8. In this way, nozzle cross sections are formed, and these become larger or smaller depending on the position of the guide blades 7 and act on the turbine wheel 4, which is mounted in the center on the axis of rotation R, to a greater or lesser extent with the exhaust gas of an engine, which is supplied via a supply duct 9 and is discharged via a central pipe stub 10, in order to drive a compressor wheel 17 seated on the same shaft by means of the turbine wheel 4.

In order to control the movements or the position of the guide blades 7, an actuating device 11 is provided. This device can be of any desired design, but a preferred embodiment has a control casing 12 which controls the control movement of a plunger element 14 fastened thereto, in order to convert the movement of said plunger element into a slight rotational movement of an adjusting ring or retaining ring 5 which is situated behind the blade bearing ring 6. A free space 13 for the guide blades 7 is formed between the blade bearing ring 6 and an annular part 15 of the turbine casing 2. In order to be able to secure said free space 13, the blade bearing ring 6 has spacers 16.

LIST OF REFERENCE SYMBOLS

1 Turbocharger
2 Turbine casing
3 Compressor casing
4 Turbine wheel
5 Adjusting ring or retaining ring
6 Blade bearing ring
7 Guide blades
8 Pivot axles
9 Supply duct
10 Axial pipe stub
11 Actuating device
12 Control casing
13 Free space for guide blades 7
14 Plunger element
15 Annular part of the turbine casing 2
16 Spacers/spacer cams
17 Compressor wheel
18 Guide grate
28 Bearing casing
R Axis of rotation

The invention claimed is:

1. A compressor wheel for a turbocharger, comprising an aluminum-based alloy having a dendritic phase microstructure, wherein the aluminum-based alloy comprises the following components: Fe: 0 to 5.0% by weight, Mn: 0.16 to 2.8% by weight, Cu: 2.7 to 5.0% by weight, Si: 0.3 to 2.05% by weight, Mg: 0.2 to 1.9% by weight, Ti: 0.05 to 1.3% by weight, Zr: 0.1 to 0.3% by weight, La: 0.1 to 0.5% by weight, Ni: 0.45 to 2.6% by weight, Ce: 0.1 to 0.5% by weight, B: 0.01 to 1.35% by weight, in each case based on the total weight of the alloy and Al as balance.

2. An exhaust gas turbocharger for diesel engines, comprising a compressor wheel consisting of an aluminum-based alloy having a dendritic phase microstructure, wherein the aluminum-based alloy comprises the following components: Fe: 0 to 5.0% by weight, Mn: 0.16 to 2.8% by weight, Cu: 2.7 to 5.0% by weight, Si: 0.3 to 2.05% by weight, Mg: 0.2 to 1.9% by weight, Ti: 0.05 to 1.3% by weight, Zr: 0.1 to 0.3% by weight, La: 0.1 to 0.5% by weight, Ni: 0.45 to 2.6% by weight, Ce: 0.1 to 0.5% by weight, B: 0.01 to 1.35% by weight, in each case based on the total weight of the alloy and Al as balance.

3. A compressor wheel for a diesel engine turbocharger, comprising an aluminum-based alloy having a dendritic phase microstructure, wherein the aluminum-based alloy comprises the following components: Fe: 0 to 5.0% by weight, Mn: 0.16 to 2.8% by weight, Cu: 2.7 to 5.0% by weight, Si: 0.3 to 2.05% by weight, Mg: 0.2 to 1.9% by weight, Ti: 0.05 to 1.3% by weight, Zr: 0.1 to 0.3% by weight, La: 0.1 to 0.5% by weight, Ni: 0.45 to 2.6% by weight, Ce: 0.1 to 0.5% by weight, B: 0.01 to 1.35% by weight, in each case based on the total weight of the alloy and Al as balance.

* * * * *